United States Patent [19]

Furuse

[11] Patent Number: 4,811,252

[45] Date of Patent: Mar. 7, 1989

[54] LEAKAGE TEST EQUIPMENT

[75] Inventor: Akio Furuse, Hachioji, Japan

[73] Assignee: Kabushiki Kaisha Kosumo Keiki, Tokyo, Japan

[21] Appl. No.: 913,292

[22] Filed: Sep. 30, 1986

[30] Foreign Application Priority Data

Apr. 4, 1986 [JP] Japan .................................. 61-77765

[51] Int. Cl.⁴ ...................... G01N 7/00; G01M 3/04; G01C 17/38
[52] U.S. Cl. ..................................... 364/556; 73/1 R; 73/49.2; 73/40; 364/558; 364/580
[58] Field of Search ........ 364/150, 151, 497, 507–509, 364/556, 558, 564, 580, 571; 73/1 H, 4 R, 40, 49.1–49.3, 49.5, 52, 149, 299, 302; 340/605; 374/4

[56] References Cited

U.S. PATENT DOCUMENTS

| | | | |
|---|---|---|---|
| 3,504,528 | 4/1970 | Weinberg et al. | 73/49.3 |
| 4,320,653 | 3/1982 | Bernhardt | 73/40 |
| 4,490,800 | 12/1984 | Powers | 364/558 |
| 4,523,452 | 6/1985 | Brayman | 73/40 |
| 4,571,986 | 2/1986 | Fujii et al. | 73/49.3 X |
| 4,575,807 | 3/1986 | Dodge | 364/558 |
| 4,587,619 | 5/1986 | Converse, III et al. | 73/49.2 X |
| 4,640,122 | 2/1987 | Héraud et al. | 73/49.2 |
| 4,686,851 | 8/1987 | Holm et al. | 73/49.2 |

Primary Examiner—Parshotam S. Lall
Assistant Examiner—Joseph L. Dixon
Attorney, Agent, or Firm—Pollock, Vande Sande and Priddy

[57] ABSTRACT

Leak test equipment which includes a master side pneumatic system and a work side pneumatic system executes a leakage test sequence basically including pressurizing, balancing and detecting steps under control of a microcomputer. A nonvolatile read/write memory has prestored therein an equivalent inner volume of the work side pneumatic system corresponding to each type of work being tested for leakage. In a leak test, a leakage $\Delta V_L = V_E \cdot \Delta P / 1.03$ is calculated on the basis of a pressure difference $\Delta P$ between the work side pneumatic system and the master side pneumatic system, detected in the detecting step, and a corresponding equivalent inner volume $V_E$ read out of the nonvolatile read/write memory. The calculated leakage is compared with an allowable value of leakage, thereby deciding whether the work is acceptable or not.

20 Claims, 9 Drawing Sheets

| ADDR | CH1 | | ADDR | CH2 | | ADD |
|------|-----|-----|------|-----|-----|-----|
| 0000 | CHG | $T_1$ | 0010 | CHG | $T_1$ | |
| 0001 | BAL | $T_2$ | 0011 | BAL | $T_2$ | |
| 0002 | DET | $T_3$ | 0012 | | | |
| 0003 | LMT | $L_1$ | 0013 | | | |
| 0004 | LMT | $L_2$ | 0014 | | | |
| 0005 | PL | $P_L$ | 0015 | | | |
| 0006 | PH | $P_H$ | 0016 | | | |
| 0007 | SMP | X | 0017 | | | |
| 0008 | EQV | $V_E$ | 0018 | EQV | $V_E$ | |
| 0009 | (CHK | $\Delta P_0$) | 0019 | | | |

LEAKAGE TEST EQUIPMENT

CROSS REFERENCE TO RELATED APPLICATIONS

The subject matter of the present application is related to applicant's following prior copending U.S. applications:

Ser. No. 666,082 filed Oct. 29, 1984, now U.S. Pat. No. 4,686,638, for "Leakage Inspection Method";

Ser. No. 674,908 filed Nov. 9, 1984, now U.S. Pat. No. 4,670,847, for "Pressure Variation Detecting Type Leakage Inspection Equipment; and Ser. No. 694,448 filed Dec. 21, 1984, now U.S. Pat. No. 4,675,834, for "Pressure Variation Detecting Type Leakage Inspection Equipment".

BACKGROUND OF THE INVENTION

The present invention relates to leakage test equipment which measures leakage of gas or liquid from a variety of vessels and decides whether the measured leakage is within a given limit.

In a conventional leakage test in a production line of vessels which are demanded to meet the requirement that the leakage of gas or liquid therefrom be within a fixed value, a vessel under test (hereinafter referred to as a work) and a leak-free reference tank (hereinafter referred to as a master tank) are coupled together, for instance, via a diaphragm type differential pressure sensor and charged with gas under the same test pressure, and then the pneumatic circuit is closed. After a certain elapsed time, the differential pressure between the work and the master tank is read and converted to the leakage for the work. It is decided whether the work is good or unacceptable, depending upon whether the converted value is within a given limit or not.

Figure 1:
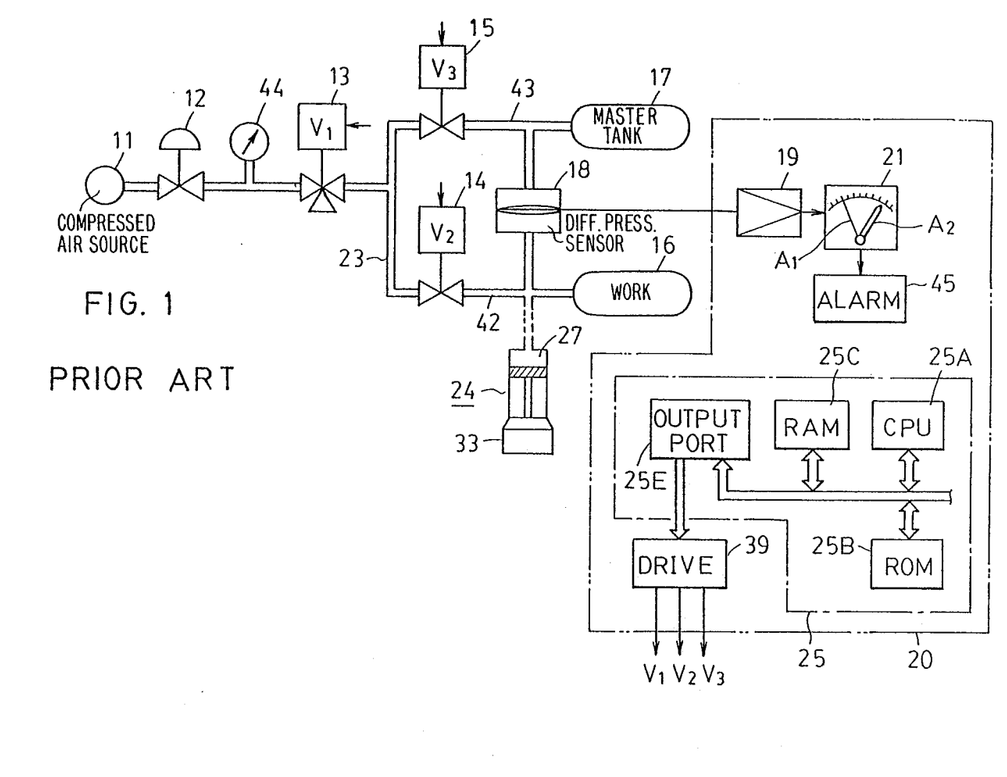
FIG. 1 is a block diagram illustrating conventional leak test equipment.
Figure 2:
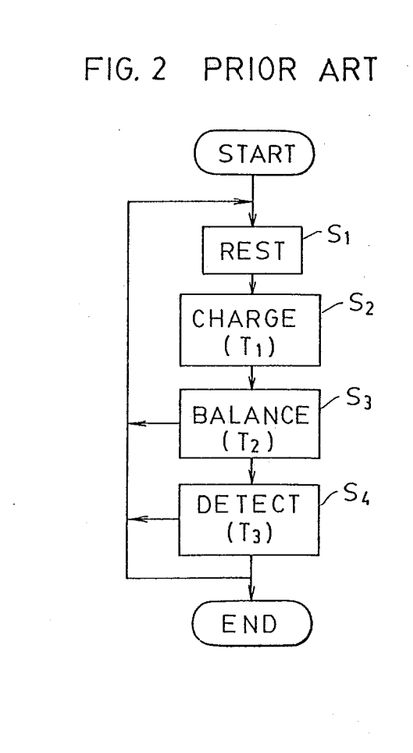
FIG. 2 is a flowchart showing the operation of the conventional leak test equipment.

FIG. 1 illustrates a typical arrangement of such conventional leakage test equipment and one complete cycle of the leak test for each vessel by the equipment is carried out through a sequence of steps shown in FIG. 2, under control of a microcomputer 25 in an operation controller 20. After setting a pneumatic pressure from a compressed air source 11 to a test pressure by a pressure reducing valve 12 while reading pressure indications on a pressure gauge 44, a work to be tested (i.e. a vessel) 16 is connected to a measuring-side pipe 42 in a rest period of step $S_1$. In a charging step $S_2$ an instruction is issued from the CPU 25A via an output port 25E to a drive power supply 39 to activate it, by which a three way electromagnetic valve 13 is communicated with a measuring pipe circuit 23 to supply air via normally open two way electromagnetic valves 14, 15 to the work 16 and a master tank 17 and, at the same time, a first timer (not shown) set in a RAM 25C is started. After a certain elapsed time $T_1$, a balancing step $S_3$ is initiated, in which pneumatic systems on the work side and the master side now put under the same test pressure are closed by the two way electromagnetic valves 14 and 15, respectively, and at the same time, a second timer (not shown) is started. Accordingly, if air leaks out of the work 16, the differential pressure across a diaphragm type differential pressure sensor 18 will increase with the lapse of time. In the event that a relatively large leakage is detected in this time period, it is decided that the work 16 is defective, and the process immediately returns to step $S_1$. After the lapse of predetermined time $T_2$ during which such a large leakage has not been detected, the process proceeds to a detection step $S_4$, in which a third timer (not shown) is set in the RAM 25C and the differential pressure between the work 16 and the master tank 17 is detected as an electric signal by the differential pressure sensor 18 and amplified by an amplifier 19 for an indication by a pointer $A_1$ of a meter relay type indicator 21. Accordingly, the differential pressure thus indicated corresponds to the leakage from the work 16 after closure of the two way electromagnetic valves 14 and 15 in step $S_3$. Where this differential pressure exceeds an allowed value set by a setting needle $A_2$ of the meter relay type indicator 21, it is decided that the work 16 is unacceptable, and an alarm 45 is actuated by the output of the meter relay 21. The process immediately returns to step $S_1$, in which the work 16 is replaced by the next work, for which the same test cycle is repeated. The test sequence is executed under control of the CPU 25A in accordance with a program stored in a ROM 25B.

Incidentally, the relationship between the leakage $\Delta V_L$ from the work 16 and the differential pressure $\Delta P$ after closure of the two way electromagnetic valves 14 and 15 in FIG. 1 can be obtained in such a manner as described below. Symbols for use in equations are defined as follows:

P: Pressure in the work and master tank at the start of detection, that is, a test pressure (Kg/cm$^2$G)

$P_W$: Pressure (Kg/cm$^2$G) in the work at the end of detection, i.e. after the lapse of time $T_3$ $P_M$: Pressure (Kg/cm$^2$G) in the master tank at the end of detection $V_W$: Inner volume (cc) of the pneumatic system on the work side at the start of detection $V_M$: Inner volume (cc) of the pneumatic system on the master tank side at the start of detection $K_S$: Volume change ratio of the diaphragm type differential sensor to pressure variations, i.e. the sensitivity of the diaphragm to the differential pressure (cc/Kg/cm$^2$)

$K_W$: Volume change ratio of the work to pressure variations (cc.Kg/cm$^2$)

$K_M$: Volume change ratio of the master tank to pressure variations (cc/Kg/cm$^2$)

$\Delta V_L$: Leakage from the work (atm cc)

$T_3$: Detection time (sec)

G: 1 atm = 1.03 Kg/cm$^2$

According to Boyle's law, the following equations hold:

$$(1.03 + P)V_W = (1.03 + P_W)[V_W - K_S \cdot \Delta P - K_W(P - P_W)] + 1.03 \cdot \Delta V_L \quad (1)$$

$$(1.03 + P)V_M = (1.03 + P_M)[V_M + K_S \cdot \Delta P - K_M(P - P_M)] \quad (2)$$

Letting $P_M \approx P$ in the differential pressure $\Delta P = P_M - P_W$ at the end of detection, $\Delta P \approx P - P_W$. Using them, Eqs. (1) and (2) are changed as follows:

$$P \cdot V_W \approx P_W \cdot V_W - (K_S + K_M)(1.03 + P_W) \cdot \Delta P + 1.03 \cdot \Delta V_L \quad (3)$$

$$P \cdot V_M \approx P_M \cdot V_M + (1.03 + P_M) \cdot K_S \cdot \Delta P \quad (4)$$

From Eqs. (3) and (4) the leakage $\Delta V_L$ is expressed as follows:

$$\Delta V_L = \frac{1}{1.03}\left\{ V_W + \left[ K_S\left(1 + \frac{V_W}{V_M}\right) + K_W\right](1.03 + P) \right\}\Delta P \quad (5)$$

In Eq. (5) $V_E$ and K are defined as follows:

$$V_E = V_W + \left[ K_S\left(1 + \frac{V_W}{V_M}\right) + K_W\right](1.03 + P) \quad (6)$$

$$K = K_S\left(1 + \frac{V_W}{V_M}\right) + K_W \quad (7)$$

Accordingly, the leakage $\Delta V_L$ is given as follows:

$$\Delta V_L = (V_E/1.03)\cdot \Delta P \quad (8)$$

The term $V_E$ is called an equivalent inner volume of the pneumatic system on the work side, and the term K is called the volume change ratio of the work side pneumatic system (cc/Kg/cm$^2$). The differential pressure per unit leakage (atm cc), that is, $\Delta P/\Delta V_L$, is the leakage detection sensitivity of this leakage test equipment, and this is given in the form of $1.03/V_E$ (Kg/cm$^2$/atm cc).

Since $K_S$, $K_W$ and $V_M$ can be regarded as constant in Eq. (6), the equivalent inner volume $V_E$ can be regarded as a function of the test pressure P and the inner volume $V_W$ of the work. Since the presure P and the inner volume $V_M$ differ with the types of works, the equivalent inner volume $V_E$ differs accordingly. The inner volume $V_E$ can be obtained in the following manner: In FIG. 1, a leak-free work is connected as the work 16, and a volume changer 24 is connected to the work side pneumatic system 42. The volume changer 24 is a syringe type device with a micrometer in which its inner volume 27 can be changed by turning a knob 33 to displace a piston in a cylinder. The amount of volume changed corresponding to the number of turns of the knob 33 is preknown. The leakage test sequence in FIG. 2 is executed and when the sequence reaches step S4, the knob 33 is turned a predetermined number of times to move back the piston, causing a volume change $\Delta V$ (an increase). Since this increased volume is equivalent to leakage, as viewed from the work side pneumatic system, the volume change $\Delta V$ can be converted by the following equation, according to Boyle's law, to the volume under the atmospheric pressure, that is, the equivalent leakage $\Delta V_L$.

$$\Delta V(1.03 + P) = \Delta V_L \times 1.03 \quad (9)$$

Subsitution of Eq. (9) into Eq. (8) gives $$V_E = (\Delta V/\Delta P) \times (1.03 + P) \quad (10)$$

Accordingly, by causing the volume change $\Delta V$, and measuring the differential pressure $\Delta P$, the equivalent inner volume $V_E$ corresponding to the work being connected can be calculated from Eq. (10) provided that the test pressure P is given. It is therefore necessary, in the prior art, to precalculate the equivalent inner volume $V_E$ for each work through use of Eq. (10) and to calculate an allowed differential pressure $\Delta P'$ corresponding to an allowable leakage $\Delta V_L'$ for each type of work, through use of Eq. (8). In the leak test, it is required that the above-mentioned allowed differential pressure $\Delta P'$ be re-set on the meter relay type indicator 21 each time the type of work is altered.

For checking the leak detection sensitivity $(1.03/V_E)$ of the leakage test equipment, a predetermined volume change is provided by the volume changer 24 as in the case of measuring the afore-mentioned equivalent inner volume, and it is checked whether the differential pressure indicated at that time stays within a predetermined range. Where the differential pressure is out of the predetermined range, it is judged that the sensitivity error is large, the equivalent inner volume $V_E$ for the work used is calculated from Eq. (10), and the value thus obtained is substituted into Eq. (8) to calculate the allowed differential pressure $\Delta P'$ corresponding to the allowable leakage $\Delta V_L'$. The leakage detection sensitivity is similarly checked for each type of work, and if necessary, the allowed differential pressure $\Delta P'$. For the type of a work formed to have a large error as a result of the leak test, a newly calculated allowable differential pressure is set on the meter relay 21 in the subsequent test for each work of the same type; and for the type of a work decided not to have a large error, the allowed differential pressure calculated in the preceding test for a work of the same type is set on the meter relay 21 in the subsequent test for the same type, thereby calibrating the leak detection sensitivity. Such checking and calibration of the leak detection sensitivity calls for a very cumbersome operation of manually turning the micrometer of the volume changer 24 a predetermined number of times for each type of work in the detection step S4, as described above.

As described previously, the leak test employs the allowable leakage as the criterion for deciding whether the work is good or bad. Since the leakage is measured by detecting the differential pressure, the allowable leakage is converted by Eq. (8) into the corresponding allowable differential pressure, which is set by the setting needle A$_2$ of the meter relay 21. As will be seen from Eq. (8), however, since the equivalent inner volume $V_E$ differs with the type of work, it is necessary to set the allowable differential pressure on the meter relay 21 for each type of work. Accordingly, in the case where different types of works are supplied to the leak test equipment through different channels, the allowed differential pressure must be set manually for each channel selection; this is very troublesome.

It is therefore an object of the present invention to provide leakage test equipment which permits direct reading of the measured leakage of a work and directly compares the leakage with the allowable leakage for deciding whether the work is good or unacceptable, and hence is free from the necessity of converting the leakage into the corresponding allowable differential pressure.

Another object of the present invention is to provide leakage test equipment which facilitates the checking and calibration of the leak detection sensitivity for each type of work.

SUMMARY OF THE INVENTION

The leakage test equipment of the present invention includes test pressure generating means, a master side pneumatic system and a work side pneumatic system connected to the test pressure generating means via first and second electromagnetic valves, respectively, differential pressure sensing means connected between the work side and the master side pneumatic systems, con trol means for controlling the first and second electromagnetic valves, a nonvolatile RAM for prestoring the equivalent inner volume for each type of work, and arithmetic means. In the leak test mode, the leakage from the work under test is calculated, by the arithmetic means, from the differential pressure detected by the differential pressure sensing means and the corresponding equivalent differential pressure read out of the nonvolatile RAM, and the thus calculated leakage and the allowable leakage corresponding thereto are compared for deciding whether the work is good or bad.

According to another aspect of the present invention, volume changing means is connected to the work side pneumatic system and drive means is provided for driving the volume changing means. In the check and calibration mode, a command is applied from the control means to the drive means in the detection step of the leak test sequence, by which the volume changing means is driven to provide a predetermined volume change. Based on the differential pressure detected and the volume change, the equivalent inner volume is calculated by the arithmetic means, and the corresponding equivalent inner volume in the nonvolatile RAM is rewritten with the newly calculated equivalent inner volume.

DESCRIPTION OF THE PREFERRED EMBODIMENTS

Figure 3A:
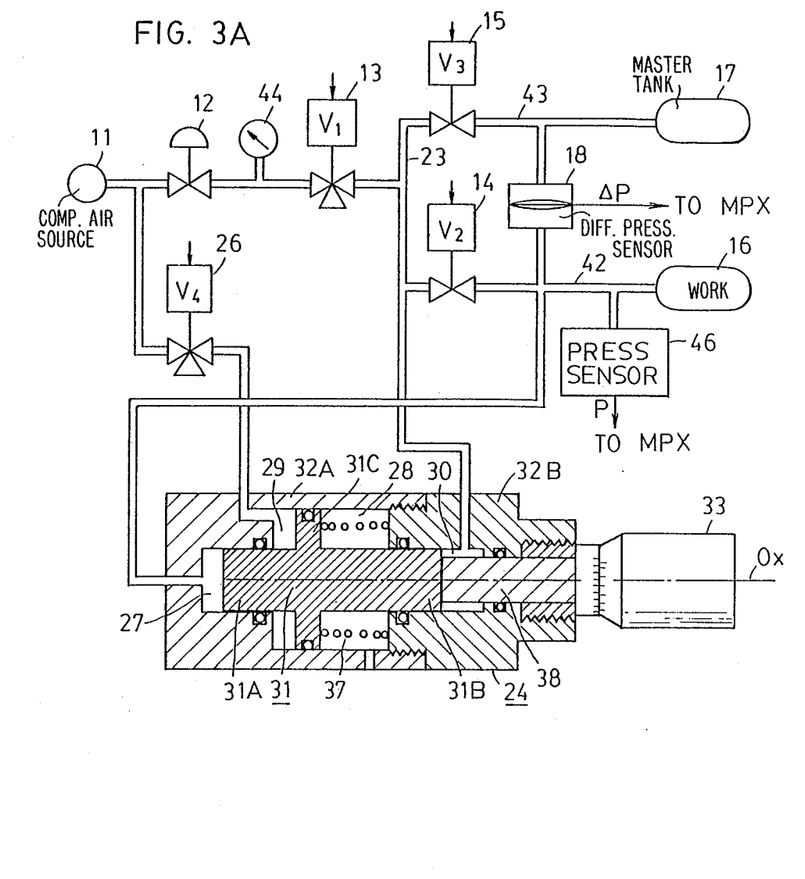
FIG. 3A illustrates the pneumatic system of leak test equipment in accordance with one embodiment of the present invention.

FIG. 3A illustrates pneumatic systems of an embodiment of the leak test equipment of the present invention. In this embodiment, the compressed air from the compressed air source 11 passes through the pressure reducing valve 12 and the three way electromagnetic valve 13 and is then branched into two for supply to the work side and master side pneumatic systems 42 and 43 via normally open two way electromagnetic valves 14 and 15, respectively. The work side pneumatic system 42 has the work (a vessel to be tested) 16 connected thereto and the master side pneumatic system 43 has the master tank (a reference tank) 17. Further connected to the work side pneumatic system 42 are a pressure sensor 46 such as a semiconductor pressure sensor and the volume changer 24. Between the work side and master side pneumatic systems 42 and 43 is connected the diaphragm type differential pressure sensor 18.

In the illustrated embodiment, compressed air is used for driving the volume changer 24, which has a structure in which a piston 31 is housed in a cylinder 32A in a manner to be slidable in alignment with its center axis. A cylindrical base 32B is fastened by screws to the cylinder 32A to close its opening. A cylindrical chamber 27 for developing a volume change is provided at the bottom of the cylinder 32A along the center axis Ox thereof. The base 32B also has a cylindrical chamber 30 formed therein along the center axis Ox. Rod portions 31A and 31B formed at the opposite ends of the piston are almost snugly received in the cylindrical chambers 27 and 30 of the cylinder 32A and the base 32B in a manner to be slidable into and out of them. The piston 31 has a flange 31C, by which the interior of the cylinder 32A is divided into two spaces 28 and 29. In the space 28 a coiled spring 37 is provided for biasing the piston 31 in a direction tending to reduce the cylindrical chamber 27. The cylindrical chamber 27 is connected via a pipe to the work side pneumatic system 42, and the space 29 is connected via a three way electromagnetic valve 26 to the compressed air source 11. Furthermore, the cylindrical chamber 30 is connected to the pipe 23, as required, by which the pressure in the chamber 30 is balanced with the pressure which is applied to the cylindrical chamber 27 at the time of charging air of the test pressure into the work 16 and the master tank 17, so as to prevent the piston 31 from moving toward a micrometer 33. For balancing the pressures in the cylindrical chamber 27 and 30, the pressure-receiving areas (i.e. the cross-sectional areas) of the rod end portions 31A and 31B receiving therein are selected substantially equal.

A predetermined volumetric change $\Delta V$ of the volume changer 24 is set in the following manner: In the state in which the piston 31 is held by the coiled spring 37 at the innermost position in the cylinder 32A, the micrometer 33 is turned in a forward direction and when the end face of its shaft 38 strikes against the end face of the piston rod 31B, the micrometer 33 is set to its zero position, after which the micrometer 33 is turned in the reverse direction by a predetermined number of times to retract the shaft 38. In this state, when the three way electromagnetic valve 26 is operated in the detection step $S_4$ shown in FIG. 2, the pressure applied to the space 29 urges the piston 31 rearwardly until it strikes against the end face of the shaft 38, providing the predetermined volumetric increase $\Delta V$ in the cylindrical chamber 27 to the work side pneumatic system 42.

Figure 3B:
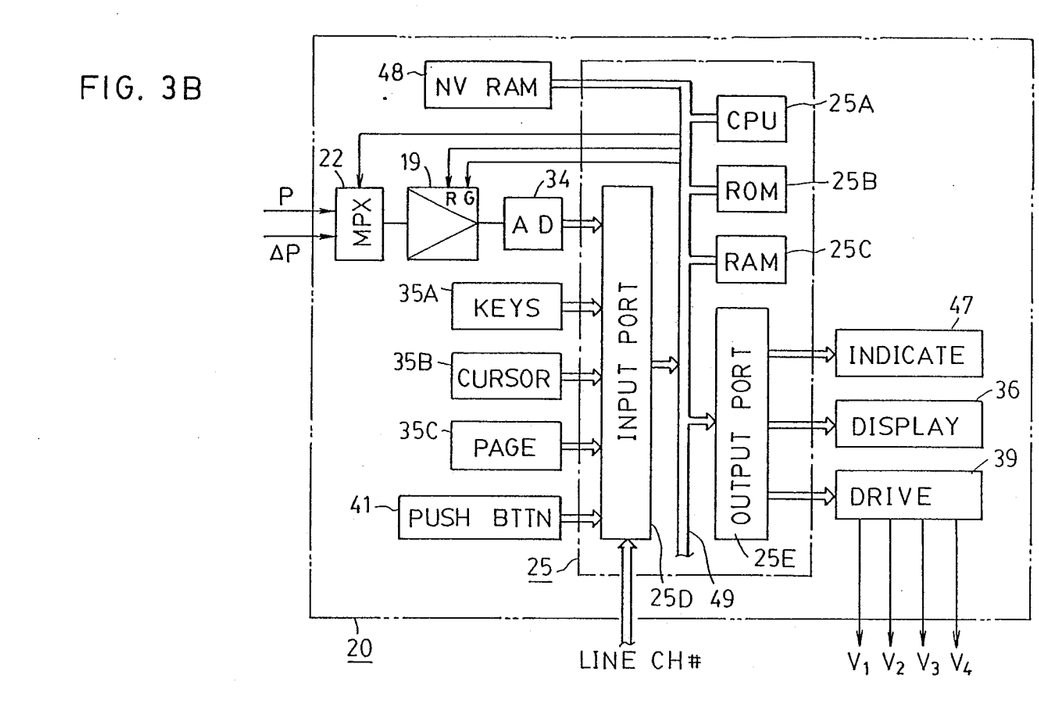
FIG. 3B is a block diagram illustrating the electric system of an operation controler 20 in the embodiment of the leak test equipment of the present invention.

The leak test equipment of the present invention is further provided with the operation controller 20, as depicted in FIG. 3B. The operation controller 20 controls the sequence of the leak test and calibration steps, controls the electromagnetic valves 13, 14, 15 and 26, receives signals from the differential pressure sensor 18 and the pressure sensor 46, calculates the leakage or equivalent inner volume, displays the leakage or actuates the alarm, and performs other necessary operations. The operation controller 20 comprises an operation control unit 25 which includes a CPU 25A, a ROM 25B, a RAM 25C, an input port 25D, and an output port 25E interconnected via a common bus 49, an amplifier 19 which is selectively connected via a multiplexer 22 to either one of the outputs of the differential pressure sensor 18 and the pressure sensor 46 and amplifies a signal therefrom, an A-D converter 34 for converting the amplified differential pressure signal or pressure signal from the amplifier 19 into a digital signal, a drive circuit 39 for driving the electromagnetic valves 13, 14, 15 and 26, a display device 36 for displaying a leakage or data input format, an indicator 47 for requesting the operator to make various decisions, a set of push buttons 41 for giving instructions in answer to the requests, a ten-key pad 35A for entering various data, a cursor shift key 35B for moving a cursor to a desired position on the display 36, and a page shift key 35C for shifting an area (a page) in a memory which is to be displayed. The outputs of the A-D converter 34, the ten-key pad 35A, the cursor shifter 35B and the page shifter 35C are supplied via the input port 25D to the bus 49, from which signals are delivered via the output port 25E to the display device 36, the driver 39, etc. In addition, it is especially important, in the preent invention, that a nonvolatile RAM 48 is provided which is connected to the common bus 49. In the nonvolatile RAM 48 is stored various data for each type of work.

Figure 5:
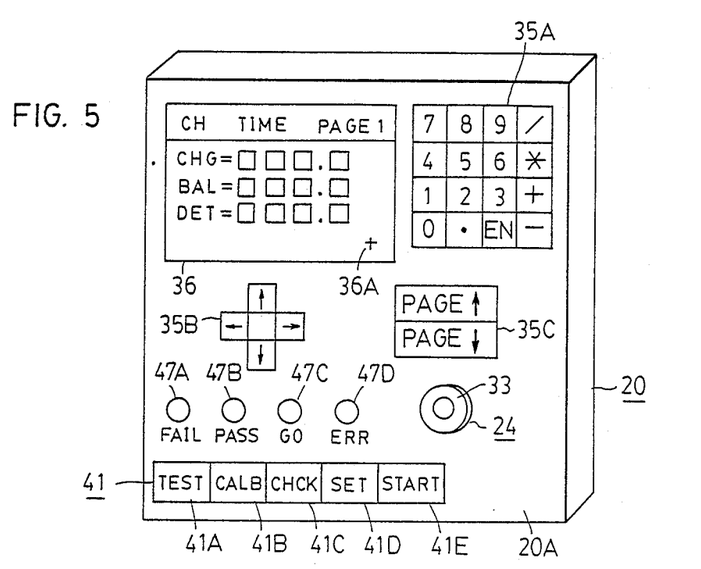
FIG. 5 is a schematic diagram showing the external appearance of the front of the operation controller 20 depicted in FIG. 3B.

FIG. 5 shows examples of the data which is stored in the nonvolatile RAM 48. The types of works are indicated by channel numbers CH1, CH2, ...; for example, data of channel 1 (CH1) is stored at addresses 000 to 009 and data of channel 2 (CH2) is stored at addresses 0010 to 0019. For instance, as data concerning the time of the channel CH1, the air charging time (CHG) $T_1$ in step $S_2$, the balancing time (BAL) $T_2$ in step $S_3$, and the detecting time (DET) $T_3$ in step $S_4$ in FIG. 2 are stored at addresses 0000, 0001 and 0002, respectively. As data concerning leakage, a criterion LMT $L_1$ for deciding a large leak which is detected in step $S_3$ and an allowable leakage LMT $L_2$ for a small leak which is detected in step $S_4$ are stored at addresses 0003 and 0004, respectively. As data on pressure, lower and upper limits $P_L$ and $P_H$ of the test pressure are stored at addresses 0005 and 0006, respectively. At an address 0007 is stored the number of samples SMP X for averaging leakages, and at an address 0008 is stored the equivalent inner volume $V_E$. The same applies to the channels CH2, CH3, and so forth. In the leak test or calibration process, the necessary data is read out from a channel area corresponding to the type of work.

FIG. 5 shows the external appearance of the front of the operation controller 20 depicted in FIG. 3B. In this embodiment the volume changer 24 is mounted on the front panel 20A of the controller 20, with the head of the micrometer 33 protrusively disposed on the front panel 20A. On the front panel 20A are further provided the ten-key pad 35A, the cursor shifter 35B, the page shifter 35C, the display 36, the push buttons 41, and the indicator 47.

Figure 6:
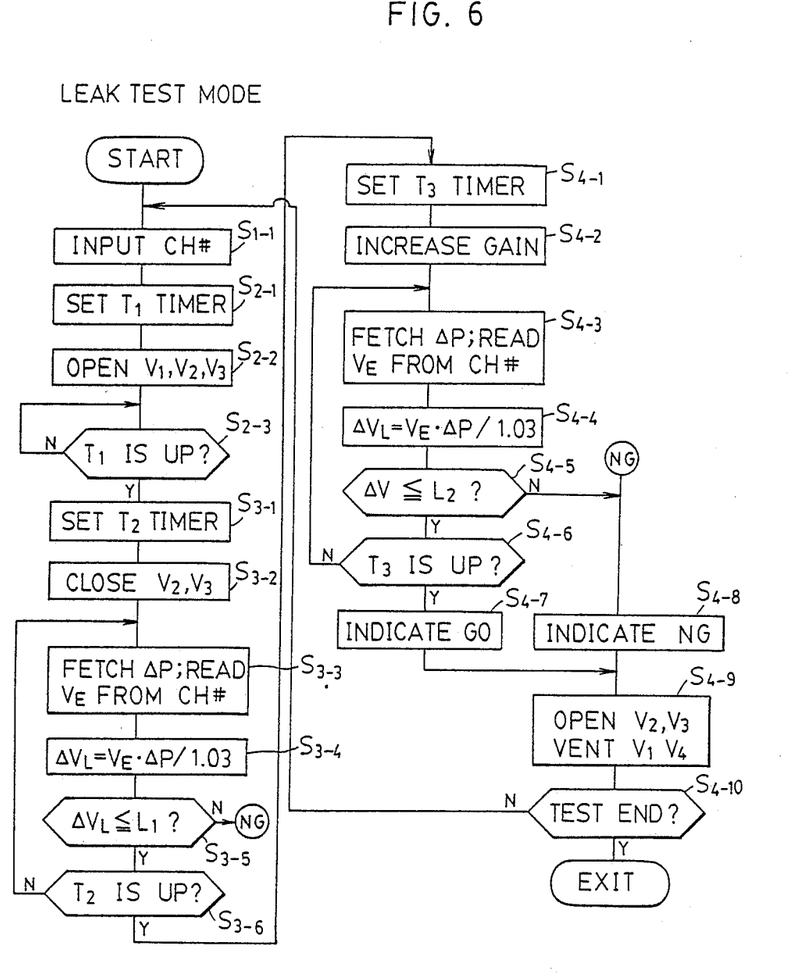
FIG. 6 is a flowchart showing operations of the leak test equipment of the present invention in its leak test mode.

The sequence of steps in the leak test mode of the leak test equipment according to the present invention shown in FIGS. 3A and 3B are substantially the same as those of the conventional sequence shown in FIG. 2. In the present invention, however, the CPU 25A is adapted to sequentially read and execute instructions of an operation program written in the ROM 25B, as shown in the flowchart of FIG. 6. That is, in a step $S_{1-1}$, the operator presses first a push button 41A to enter an instruction for selecting the test mode, connects the work to the work side pneumatic system 42, and sets the pressure in the work 16 substantially to the test pressure by adjusting the pressure reducing valve 12 while observing the pressure gauge 44. In a series of leak tests the same test pressure is usually employed even for different types of works, so once the test pressure is set, its setting is not needed in each of the subsequent leak tests. Upon setting of the work 16, the channel number data CH# corresponding to its type is input via the input port 25D into the CPU 25A. The channel number data CH# is usually provided from a test system (not shown) which controls the automatic leak test step in the work production line, but it may also be entered through the ten-key pad 35A by the operator.

Next, the pressurizing process is initiated. In a step $S_{2-1}$ charging time data CHG $T_1$ of the channel is read out of the nonvolatile RAM 48 and set at a predetermined address position in the RAM 25C, setting a $T_1$ timer which is decremented from the set value at predetermined time intervals. In a step $S_{2-2}$ the CPU 25A delivers command data via the bus 49 and the output port 25E to the driver 39 for conducting the three way electromagnetic valve 13. At this time, since the normally open two way electromagnetic valves 14 and 15 are open, the charging of compressed air to the work side and master side pneumatic systems is initiated. In a step $S_{2-3}$ it is checked whether the set time $T_1$ has passed or not.

After the lapse of time $T_1$ the balancing process is initiated. In a step $S_{3-1}$ balancing time data BAL $T_2$ of the corresponding channel is read out of the nonvolatile RAM 48 and set at a predetermined address position of the RAM 25C, setting a $T_2$ timer. In a step $S_{3-2}$ command data is provided from the CPU 25A to the driver 39 for closing the two way electromagnetic valves 14 and 15. In the next step $S_{3-3}$ the CPU 25A delivers a select instruction to the multiplexer 22 and inputs the sensed differential pressure $\Delta P$ from the differential pressure sensor 18 as the digital value from the A-D converter 34. In the next step $S_{3-4}$ the CPU 25A reads out the equivalent inner volume $V_E$ from the corresponding channel in the nonvolatile RAM 48, and calculates the leakage $\Delta V_L$, using Eq. (8). In the next step $S_{3-5}$ the CPU 25A compares the calculated leakage $\Delta V_L$ with the allowable large leak $L_1$ read out of the corresponding channel in the nonvolatile RAM 48. If the former is greater than the latter, the process will proceed to a step $S_{4-8}$, in which the CPU 25A applies a signal to the indicator 47 to light an alarm lamp 47A, indicating the presence of a leak. In the opposite case, a check is made in a step $S_{3-6}$ as to whether the set time $T_2$ of the $T_2$ timer has passed or not. If not, the CPU 25A will be returned to the step $S_{3-3}$, in which it reads the differential pressure $\Delta P$ and repeats the detection of a large leak.

In the case where the leakage $\Delta V_L$ is smaller than the allowable large leak value, when the time $T_2$ has passed, the CPU 25A initiates the detection process. In a step $S_{4-1}$ it reads out detecting time data DET $T_3$ of the corresponding channel from the nonvolatile RAM 48 and sets it at a predetermined address position in the RAM 25C, forming a $T_3$ timer. In the next step $S_{4-2}$ the CPU 25A switches the gain of the amplifier 19 to a larger one and, at the same time, resets the output of the amplifier 19 to zero. In the next step $S_{4-3}$ the differential pressure $\Delta P$ from the differential pressure sensor 18 is read into the CPU 25A via the A-D converter 34. In the next step $S_{4-4}$ the equivalent inner volume $V_E$ is read out of the corresponding channel of the nonvolatile RAM 48 and the leakage $\Delta V_L$ is calculated using Eq. (8). In the next step $S_{4\text{-}5}$ the thus calculated leakage $\Delta V_L$ is compared with the allowable small leak value $L_2$ read out of the corresponding channel of the nonvolatile RAM 48, and if the former is greater than the latter, the operation will proceed to a step $S_{4\text{-}8}$, in which the alarm lamp 47A is lighted, indicating the presence of a leak. In the opposite case, a check is made, in a step $S_{4\text{-}6}$, as to whether the set time $T_3$ of the $T_3$ timer has passed or not. If not, the operation will return to the step $S_{4\text{-}3}$, in which the differential pressure $\Delta P$ is read out again and the same small leak detection is repeated. In the case where the calculated lekage $\Delta V_L$ is smaller than the allowable small leak value $L_2$ and the time $T_3$ has passed, it is decided in a step $S_{4\text{-}7}$ that the leakage from the work is smaller than the allowable value $L_2$ and accordingly the work is acceptable, and a pilot lamp 47B is lighted for providing an indication to that effect. Thereafter, in a step $S_{4\text{-}9}$ the CPU 25A delivers commands to the driver 39 to release the drive signals having closed the two way electromagnetic valves 14 and 15 and to vent the three way electromagnetic valve 13. In a step $S_{4\text{-}10}$ it is decided whether the leak test has been completed for all works, and if not, the operation will return to the step $S_{1\text{-}1}$, in which the next work is set and the same test as mentioned above is repeated therefor.

Figure 7A:
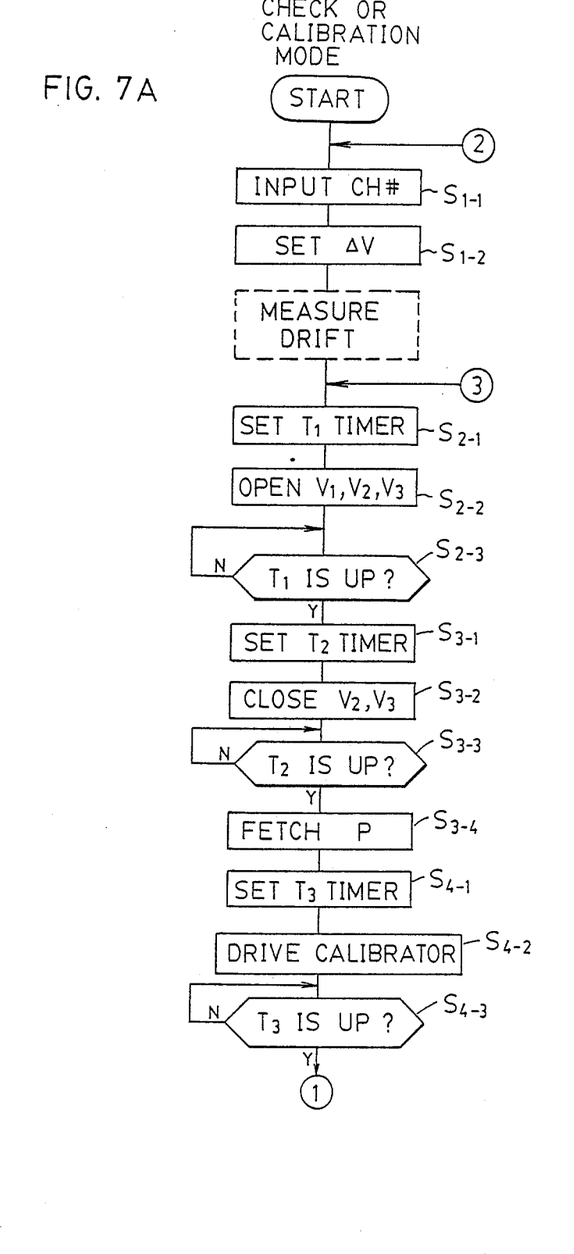
FIGS. 7A and 7B, considered together, are a flowchart for a check/calibration mode of the leak test equipment of the present invention.
Figure 7B:
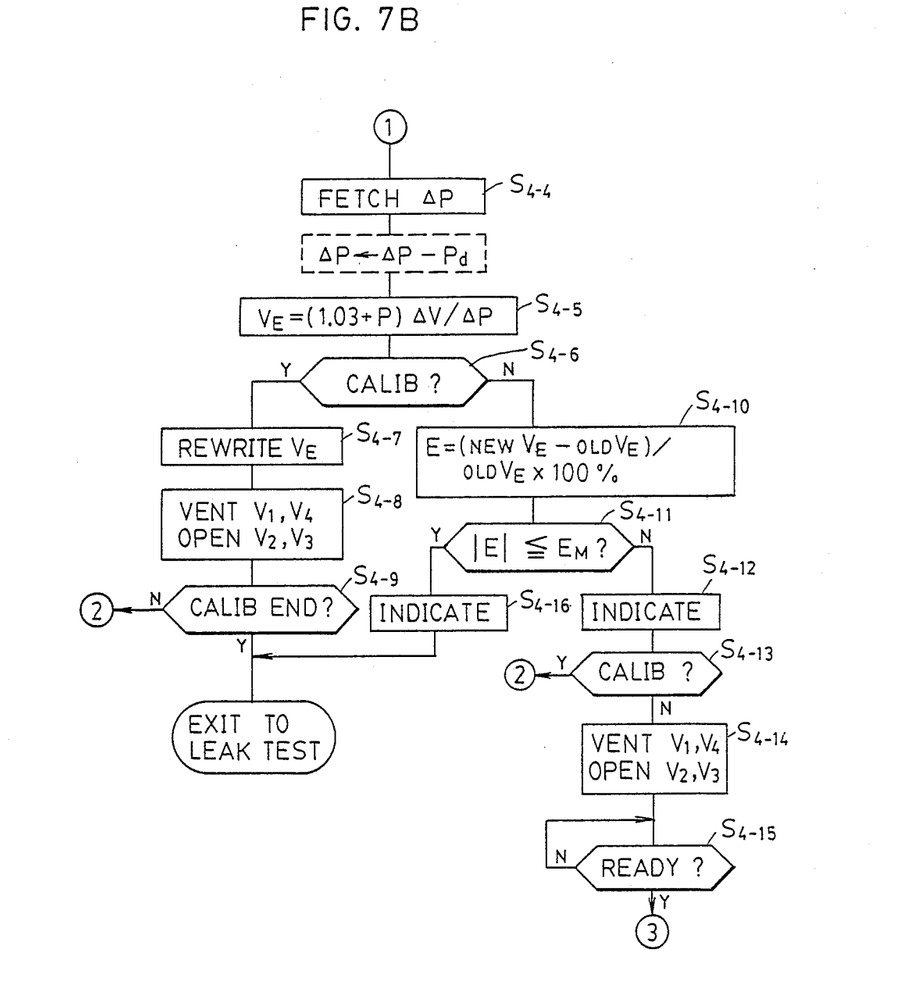

Next, a description will be given, with reference to FIGS. 7A and 7B, of the check/calibration mode. As referred to previously, the calibration is to newly measure the equivalent inner volume $V_E$ and rewrite the old data therewith. The sequence for the check and calibration basically includes the pressurizing, balancing and detecting processes as is the case with the leak test sequence shown in FIG. 2. In a step $S_{1\text{-}1}$ a leak-free work of the same type as a work to be checked or calibrated is connected to the work side pneumatic system 42. Further, it is specified, by pressing a push button 41B or 41C, which of the check and calibration modes is to be initiated. In a step $S_{1\text{-}2}$ the volumetric change (an increase) $\Delta V$ to be produced is set by turning the micrometer head 33, and its value is entered through the ten-key pad 35A for storage at a predetermined location in the RAM 25C.

Next, the pressurizing process is initiated. In a step $S_{2\text{-}1}$ the charging time data CHG $T_1$ of the channel corresponding to the type of the work is read out of the nonvolatile RAM 48 and is set at a predetermined location in the RAM 25C, establishing a $T_1$ timer. In the next step $S_{1\text{-}2}$ the CPU 25C instructs the driver 39 to conduct the three way electromagnetic valve 13, through which the compressed air set to the pressure P is charged into the work side and master side pneumatic systems 42 and 43. When it is decided in the next step $S_{2\text{-}3}$ that the time $T_1$ has passed, the next balancing process is initiated.

In a step $S_{3\text{-}1}$ of the balancing process the balancing time data BAL $T_2$ of the corresponding channel is read out of the nonvolatile RAM 48 and is set at a predetermined location in the RAM 25C, setting up a $T_2$ timer. In the next step $S_{3\text{-}2}$ an instruction is issued to the driver 39 to close the two way electromagnetic valves 14 and 15. When it is decided in a step $S_{3\text{-}3}$ that the time $T_2$ has passed, the process proceeds to the next step $S_{3\text{-}4}$ in which the CPU 25A issues a select instruction to the multiplexer 22 and inputs via the amplifier 19, the A–D converter 34, and the input port 25D the test pressure P indicated by the pressure sensor 46.

In a step $S_{4\text{-}1}$ of the detection process the detecting time data DET $T_3$ of the corresponding channel is read out of the nonvolatile RAM 48 and is set at a predetermined location in the RAM 25C, establishing a $T_3$ timer. The gain of the amplifier 19 is set to a large one and the output is reset to zero. In the next step $S_{4\text{-}2}$ the CPU 25A instructs the driver 39 to operate the three way electromagnetic valve 26. As a result of this, the piston 31 of the volume changer 24 moves toward the micrometer head 33, by which the volume of the cylindrical chamber 27 is increased by the set value $\Delta V$, that is, a volumetric change $+\Delta V$ is deveiooped in the work side pneumatic system 42. When it is decided in the next step $S_{4\text{-}3}$ that the time $T_3$ has passed, the CPU 25C inputs the differential pressure $\Delta P$ from the differential pressure sensor in the next step $S_{4\text{-}4}$ (FIG. 7B). In the next step $S_{4\text{-}5}$ the equivalent inner volume $V_E$ is calculated, using Eq. (8), from the test pressure P, the volumetric change $\Delta V$ and the differential pressure $\Delta P$ obtained previously. In the next step $S_{4\text{-}6}$ it is checked whether the mode specified by the operator is the calibration mode or not. If so, the calculated equivalent inner volume $V_E$ is displayed on the display device 36, along with the test pressure P, the differential pressure $\Delta P$ and the volumetric change $\Delta V$ in the next step $S_{4\text{-}7}$. At the same time, the newly calculated inner volume $V_E$ is substituted for the equivalent inner volume data $V_E$ previously stored in the corresponding channel of the nonvolatile RAM 48. In the next step $S_{4\text{-}8}$ the two way electromagnetic valves 14 and 15 ($V_2$ and $V_3$) are operated, through which the three way electromagnetic valves ($V_1$ and $V_4$) are vented. In the next step $S_{4\text{-}7}$ it is checked whether the calibration has been completed for all the required types of works. If not, the process will return to the step $S_{1\text{-}1}$, in which a leak-free work of the next type is set.

If it is decided that the calibration has been completed, then the operation may shift to the leak test mode. In the case where the result of decision in the step $S_{4\text{-}6}$ is NO, it is decided that the operator has specified the check mode, and in a step $S_{4\text{-}10}$ an error (%) is calculated between the newly calculated equivalent inner volume $V_E$ (NEW $V_E$) and the prestored one $V_E$ (OLD $V_E$) read out of the nonvolatile RAM 48, and the error is displayed on the display 36, together with the new and old equivalent inner volumes. When it is decided in the next step $S_{4\text{-}11}$ that the error E is smaller than a predetermined value $E_M$, the operation proceeds to a step $S_{4\text{-}16}$, in which a GO lamp 47C is lighted, indicating that the leak test mode shown in FIG. 6 may be entered. Where it is decided that the error E is greater than the predetermined value $E_M$, an ERROR lamp 47D is lighted in a step $S_{4\text{-}12}$. In this instance, if the ERROR lamp 47D is lighted for the first time, then the operator will judge that it is necessary to check whether the leak test equipment is out of order or not, and will press the push buttom 41C for the check. Accordingly, it is decided by the CPU 25A that the result of checking, in a step $S_{4\text{-}13}$, as to whether the calibration mode is specified is NO, and the operation proceeds to a step $S_{4\text{-}14}$, in which the three way electromagnetic valves 13 and 26 ($V_1$ and $V_4$) are vented and the two way electromagnetic valves 14 and 15 ($V_2$ and $V_3$) are opened. The operator may check the differential pressure sensor and other devices and joints or connecting portions of the pneumatic systems 42 and 43 for trouble, and if a trouble is found, it is properly remedied to make the equipment ready for the check mode, after which the push button 41C is pressed for starting the check mode. Upon detection of pressing the CHECK button in step $S_{4-15}$, the operation goes back to the step $S_{2-1}$ and the check mode is carried out again in the same manner as described above. In a case where it is decided again in the step $S_{4-11}$ that the error E is greater than the predetermined value $E_M$ and the error lamp 47D is lighted again in the step $S_{4-12}$, since the lighting of the error lamp is second and since the equipment has already checked, the operator judges that the equipment is in order, and hence the calibration should be executed, and he presses a CALB button 41B. It is detected in a step $S_{4-13}$ that the calibration button was pressed, and the operation returns to the step $S_{1-1}$, initiating the calibration mode. The calibration mode is repeated until the calibration has been completed for required types of works.

In the manner described above, the sensitivity of the leak test equipment for every type of work is checked or calibrated. Usually, prior to the sensitivity check or calibration, the amount of drift of the leak test equipment is measured as a differential pressure drift Pd before the step $S_{2-1}$ in FIG. 7A, as indicated by the broken line, and the detected differential pressure $\Delta P$ is compensated for drift after the step $S_{4-4}$, as indicated by the broken line. This drift compensation is described in detail, for instance, in U.S. patent application Ser. No. 674,908 filed on Nov. 5, 1984 (now U.S. Pat. No. 4,670,847) and U.S. patent application Ser. No. 666,082 filed on Oct. 29, 1984, now U.S. Pat. No. 4,686,638 and so no description will be given of the drift compensation.

Figure 4:
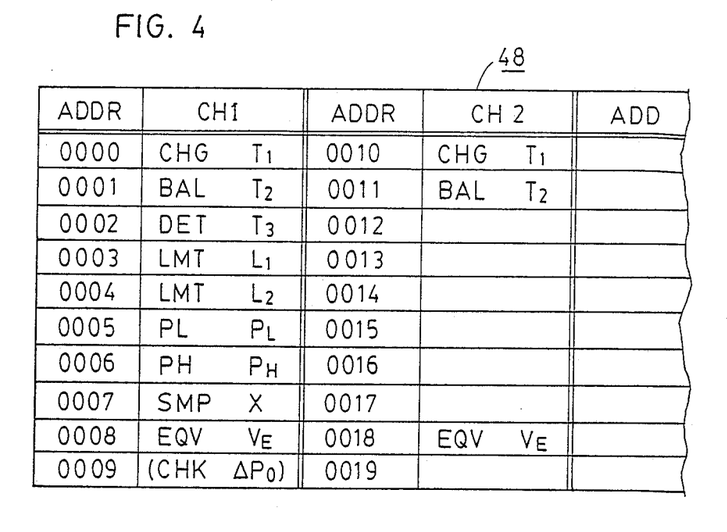
FIG. 4 is a table showing, by way of example, the contents of data stored in a nonvolatile read/write memory 48 in the present invention.

Furthermore, as will be appreciated from the above, the leak test equipment of the present invention is characterized in that in either of the leak test mode and the check/calibration mode, various data belonging to the channel corresponding to the type of work being connected is read out of the nonvolatile RAM 48 and used. Accordingly, these data must be prestored in the nonvolatile RAM 48. In the above-described embodiment of this invention equipment, the necessary data is entered through utilization of a screen edit scheme as described below. By pressing a push-button switch 41D (SET) on the front panel of the operation controller 20 shown in FIG. 5, a signal indicating data entry is provided to the CPU 25A. The CPU 25A responds to this signal to initiate the execution of a data setting program stored in the ROM 25B. At first, terms which indicate the type of data to be entered, such as TIME, LIMIT, CONDITION, etc. are displayed on the display 36. The operator manipulates the cursor shifter 35B to move a cursor 36A onto the term specifying the type of data to be entered, for example, TIME. In this case, the display TIME flashes. Next, an entry key EN is pressed and the channel number corresponding to the kind of work, for example, a "1", is entered through the ten-key pad 35A. After this, upon pressing the entry key EN, the data format of a page 1 in which the specified TIME data of the specified channel 1 is to be entered is displayed, for example, in such a form as shown, on the display 36. The data format is for inputting the time data CHG, BAL and DET in the nonvolatile RAM 48 depicted in FIG. 4. By moving again the cursor 36A through the cursor shifter 35B so that, for instance, the display CHG is specified and flashed, by entering the charging time $T_1$ through the ten-key pad 35A, and by pressing the entry key EN, the value of the input time $T_1$ is displayed on the line CHG. Thereafter, the balancing time $T_2$ and the detecting time $T_3$ are entered in the same manner as described above.

In the case of entering LIMIT data concerning the limits of the allowable leakage, the test pressure, etc. after entering the TIME data, when the page is stepped by the page shifter 35C, the data format of a page 2 of the channel 1 is displayed; so the data can be entered by the same operation as mentioned above. Furthermore, data already written can similarly updated or edited as well.

In the embodiment illustrated in FIGS. 3A and 3B, in the case where the test pressure is relatively low and even if the pressure for balancing is not applied to the cylindrical chamber 30 of the volume changer 24 from the work side pneumatic system 42, the piston 31 can be retained, by the spring force of the coiled spring 37, at the home position remotest from the shaft 38 of the micrometer, against the test pressure applied to the cylindrical chamber 27, the pipe 23 need not be connected to the cylindrical chamber 30. In such a case, the pressure which can be applied from the compressed air source 11 to the space 29 via the electromagnetic valve 26 needs only to be large enough to overcome the spring force of the coiled spring 37.

Figure 8:
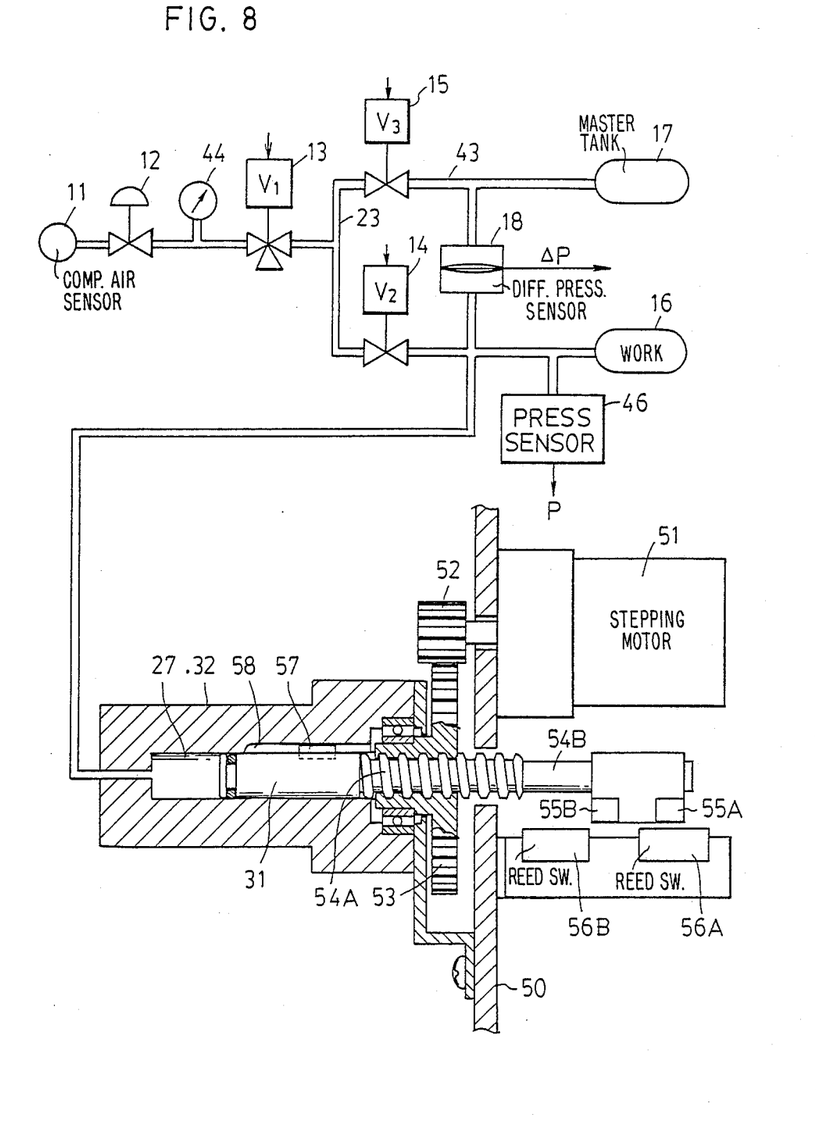
FIG. 8 is a diagram illustrating another example of the volume changer for use in the leak test equipment of the present invention.

While in the embodiment of FIG. 3A the compressed air is employed for driving the volume changer 24, a stepping motor (a pulse motor) may also be utilized therefor, as shown in FIG. 8. The volume changer 24 is mounted on a vertical panel 50 in the housing of the operation controller 20 (FIG. 5), and it includes the cylinder 32 and the piston 31 received therein. The piston 31 has a key 57 protrusively provided on its outer periphery and extending in parallel to its center axis. As the piston 31 moves, the key 57 is guided along a groove 58 cut in the interior surface of the cylinder 32 and extending in its axial direction, thereby preventing the piston 31 from rotation. A gear 52 mounted on the motor shaft of a stepping motor 51 disposed on the vertical panel 50 meshes with a drive gear 53. A screw rod 54A formed integrally with the piston 31 is inserted into the bore of the drive gear 53 and threadedly engaged therewith. The drive gear 53 is fixed with its axis in alignment with that of the cylinder 32. Extended from the screw rod 54A in its axial direction is a rod 54B, on which limit magnets 55A and 55B are mounted. Reed switches 56A and 56B are fixedly disposed in opposing relation to the paths of movement of the limit magnets 55A and 55B, by which it is possible to detect a maximum volume position and a minimum volume position (home position), respectively.

In the case of performing the check or calibration in the embodiment shown in FIG. 8, the CPU 25A calculates, in the step $S_{1-2}$ of the flowchart in FIG. 7, the number of pulses N on the basis of the volumetric change $\Delta V$ to be produced, which is entered through the ten-key pad 35A. In the step $S_{4-2}$ the CPU 25A causes a motor drive circuit (not shown) to generate the calculated number N of pulses, which are applied to the stepping motor 51, rotating it N steps. As a result of this, the piston 31 is urged backward, providing the set volumetric change $\Delta V$ to the cylindrical chamber 27. The operations in the other steps are identical with those (shown in FIG. 7) in the case of the embodiment shown in FIG. 8.

In the flowchart depicted in FIG. 7, CHECK MODE is performed by measuring the equivalent inner volume $V_E$ and comparing it with the old one $V_E$ stored in the nonvolatile RAM 48; but is is also possible to carry out this mode by measuring an equivalent volumetric change $\Delta V_E$ and comparing it with the preknown one $\Delta V_E$. This is based on the following principle. The volumetric change $\Delta V$ (under the test pressure P) which is applied by the volume changer 24 to the work side pneumatic system is equivalent to a leakage, and accordingly the leakage $\Delta V_L$ under the atmospheric pressure, shown in Eq. (8), can be converted by Eq. (9) to the volume $\Delta V$, that is, the equivalent volumetric change $\Delta V_E$, under the test pressure P. Setting $\Delta V_E$ for $\Delta V$ in Eq. (9) and substituting $\Delta V_L$ in Eq. (8) into Eq. (9), the following equation is obtained.

$$\Delta V_E = \frac{\Delta P \cdot V_E}{1.03 + P} \qquad (11)$$

Figure 9:
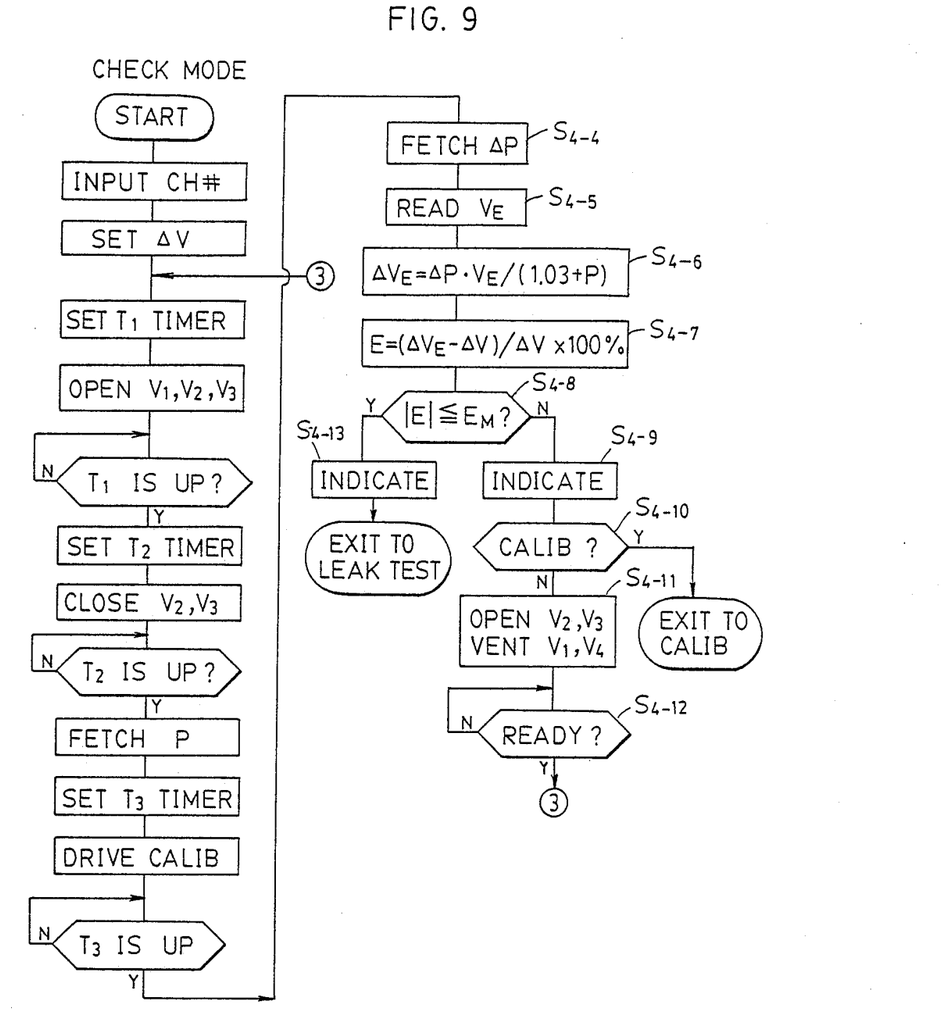
FIG. 9 is a flowchart showing another example of the check mode of the leak test equipment of the present invention.

Accordingly, if the leak detection sensitivity ($1.03/V_E$) of the leak test equipment is correct, that is, if $V_E$ is correct, the equivalent volumetric change $\Delta V_E$ calculated by Eq. (11) ought to be equal to the volumetric change $\Delta V$ produced. By comparing the volumetric change $\Delta V$ and the equivalent volumetric change $\Delta V_E$ on the basis of the above, the sensitivity of the leak test equipment can be checked. FIG. 9 shows the process for the sensitivity check based on the above principle. Steps $S_{1-1}$ through $S_{4-3}$ are identical with those of the checking process shown in FIG. 7, and hence will not be described, and only a step $S_{4-4}$ et seq. will be described.

In step $S_{4-4}$ of FIG. 9 the differential pressure $\Delta P$ resulting from a volumetric change is input into the CPU 25A from the differential pressure sensor 18 via the input port 25D. In the next step $S_{4-5}$ the equivalent inner volume $V_E$ of the corresponding channel is read out of the nonvolatile RAM 48. In the next step $S_{4-6}$ the CPU 25A calculates the equivalent volumetric change $\Delta V_E$ and, in the next step $S_{4-7}$, calculates the error E (%) between the set volumetric change $\Delta V$ and the equivalent volumetric change $\Delta V_E$. In the next step $S_{4-8}$ it is checked whether the error E is within the range of the allowable error $E_M$ or not. The following steps are identical with the step $S_{4-11}$ and the subsequent steps shown in FIG. 7.

While in the above embodiments of the present invention, the indicators 47A, 47B, 47C and 47D are described to be lamps, it is apparent that any of them may be means for generating a sound which implies an indication or alarm, or a combination of a lamp and such sound generating means. Accordingly, the indicator means in the appended claims are not limited specifically to lamps or similar optical indication means.

The CHECK mode in the flowchart shown in FIG. 7 may also be executed under an operation program independent of the CALIBRATION mode.

In the steps $S_{3-4}$ and $S_{4-4}$ of the LEAK TEST MODE flowchart depicted in FIG. 6, it is also possible to calculate the leakage rate $Q_L = \Delta V_L/T_3$ (atm cc/sec) in place of the leakage $\Delta V_L$. In this instance, allowable leakage rates $Q_M$ and $Q_m$ are stored at the locations of the limit values $L_1$ and $L_2$ of each channel in the nonvolatile RAM 48, and in the steps $S_{3-5}$ and $S_{4-5}$ the stored leakage rates $Q_M$ and $Q_m$ of the corresponding channel are read out of the nonvolatile RAM 48 for use as the criteria for decision. Of course, the leakage rates may also be expressed in terms of minute.

In the case of expressing, in mmAg, the differential pressure $\Delta P$ detected by the differential pressure sensor, since 1 $Kg/cm^2G = 10^4$ mmAg, for example, Eq. (8) becomes as follows:

$$\Delta V_L = \frac{V_E}{1.03 \times 10^4} \cdot \Delta P \qquad (8')$$

Also in the flowcharts depicted in FIGS. 6, 7 and 9, it is necessary only to replace $\Delta P$ with $\Delta P/10^4$ in a similar manner.

It will be apparent that many modifications and variations may be effected without departing from the scope of the novel concepts of the present invention.

What is claimed is:

1. Leak test equipment comprising:
    (a) a master side pneumatic system with a reference tank connected thereto;
    (b) a work side pneumatic system with a work replaceably connected thereto;
    (c) compressed air supply means for charging air of an equal test pressure into the master side pneumatic system and the work side pneumatic system;
    (d) differential pressure sensing means, connected between the master side pneumatic system and the work side pneumatic system, for detecting a pressure difference $\Delta P$ therebetween;
    (e) nonvolatile read/write memory means for storing an equivalent inner volume $V_E$ of the work side pneumatic system, corresponding to the type of each work;
    (f) control arithmetic means connected to the nonvolatile read/write memory means, for controlling a sequence including pressurizing, balancing and detecting processes for the master side pneumatic system and the work side pneumatic system, whereby, in a leak test mode, a leakage $\Delta V_L$ from the work under test is calculated on the basis of the corresponding equivalent inner volume $V_E$ read out of the nonvolatile read/write memory means and the pressure difference $\Delta P$ supplied from the differential pressure sensing means in the detecting process, the pressure difference $\Delta P$ being caused by a leak from the work, decides whether the leakage calculated exceeds an allowable leakage or not, and outputs the decision; and
    (g) indicator means for indicating leakage from a work being tested, on the basis of the decision output from the control arithmetic means.

2. Leak test equipment according to claim 1 further including volume changing means connected to the work side pneumatic system, for causing a preknown change in the inner volume of the work side pneumatic system in a check/calibration mode.

3. Leak test equipment according to claim 2, further including work side pressure sensing means, connected to the work side pneumatic circuit, for detecting its pressure.

4. Leak test equipment according to claim 2, wherein the volume changing means includes a volume changer settable to produce a desired volumetric change, and pneumatic driving means responsive to a drive signal from the control arithmetic means to pneumatically drive the volume changer to develop the volumetric change set therein.

5. Leak test equipment according to claim 4, wherein the volume changer includes:
    a cylinder body having a cylindrical bore extending in its axial direction;

a piston slidably housed in the cylindrical bore, the piston having at one end a columnar rod defining a variable volume chamber for developing the volumetric change in the cylindrical bore, and a flange provided on the outer periphery of the rod and defining at one side of a piston driving air chamber for pneumatically driving the piston to develop the volumetric change in the cylindrical bore;

micrometer means mounted on one end of the cylinder body, for setting the magnitude of the volumetric change, the micrometer means having a stopper shaft inserted into the cylindrical bore and permitting the piston to move by a distance corresponding to the volumetric change; and a coiled spring disposed in the cylindrical bore at the other side of the flange, for biasing the piston toward its home position before the volumetric change is provided;

wherein the variable volume chamber is connected to the work side pneumatic system through a first through hole made in the cylinder body, and the driving air chamber is connected to the pneumatic driving means through a second through hole made in the cylinder body.

6. Leak test equipment according to claim 5, wherein the compressed air supply means has a compressed air source and a pressure reducing valve connected thereto for reducing the pressure of the compressed air to a value substantially equal to the test pressure, the pneumatic driving means is constituted by connecting said second through hole to the compressed air source through a three way electromagnetic valve, the three way electromagnetic valve being controlled by a drive signal from the control arithmetic means.

7. Leak test equipment according to claim 5, wherein both end portions of the cylindrical bore are reduced in diameter to form first and second receiving holes for slidably receiving both end portions of the rod of the piston, and said variable volume chamber is defined by one of the end faces of the rod in one of the first and second receiving holes.

8. Leak test equipment according to claim 7, wherein a balancing air chamber is defined by the other end face of the rod in the other of the first and second receiving holes, and is connected to the compressed air supply means through a third through hole made in the cylinder body, both end faces of the rod having substantially the same area.

9. Leak test equipment according to claim 8, wherein a stopper shaft is inserted in the balancing air chamber, and the volumetric change is set by setting the position of the free end face of the stopper shaft.

10. Leak test equipment according to claim 8, wherein a stopper shaft is inserted in said variable volume chamber, and a volumetric change to be provided is set by setting the position of the free end face of the stopper shaft.

11. Leak test equipment according to claim 2, wherein the volume changing means includes a volume changer capable of setting the volumetric change to a desired value, and a pulse motor responsvie to a drive signal from the control arithmetic means to drive the volume changer to develop the desired volumetric change.

12. Leak test equipment according to claim 11, wherein the volume changer means includes a cylinder body having a cylindrical bore closed at one end by a wall having a through hole made therein, a piston slidably received in the cylindrical bore for defining a variable volume chamber in which the volumetric change is produced, a drive shaft coupled with the piston and projecting out at one end from the cylindrical bore, and gear means engaged between the rotary shaft of the pulse motor and the drive shaft of the piston for converting the rotation of the pulse motor to the movement of the piston in its axial direction in accordance with the volumetric change, the variable volume chamber being connected to the work side pneumatic system through the through hole.

13. Leak test equipment provided with a check function, comprising:
(a) means for charging compressed air of a test pressure into a master side pneumatic system having a reference tank connected thereto and a work side pneumatic system having a work connected thereto;
(b) differential pressure sensing means for measuring the pressure difference between the master side pneumatic system and the work side pneumatic system;
(c) volume changing means connected to the work side pneumatic system, for changing its inner volume by a known amount;
(d) equivalent inner volume calculating means for calculating an equivalent inner volume of the work side pneumatic system on the basis of the pressure difference between the work side pneumatic system and the master side pneumatic system, resulting from the volumetric change by the volume changing means and measured by the differential pressure sensing means, the volumetric change, and the test pressure;
(e) a nonvolatile RAM for storing the equivalent inner volume calculated for each type of work;
(f) check means whereby a new equivalent inner volume computed by the equivalent inner volume calculating means and the corresponding old equivalent inner volume stored in the nonvolatile RAM are compared with each other and it is decided whether an error therebetween is within a predetermined value or not;
(g) leakage calculating means for calculating the leakage from the work on the basis of the corresponding equivalent inner volume read out of the nonvolatile RAM and the pressure difference measured by the differential pressure sensor;
(h) means for deciding whether the leakage calculated by the leakage calculating means is within an allowable leakage range; and
(i) indicating means for indicating a decision of the deciding means.

14. Leak test equipment provided with a check function, comprising:
(a) means for charging compressed air of a test pressure into a master side pneumatic system having a reference tank connected thereto and a work side pneumatic system having a work connected thereto;
(b) differential pressure sensing means for measuring the pressure difference between the master side pneumatic system and the work side pneumatic system;
(c) volume changing means connected to the work side pneumatic system, for making a volumetric change in its inner volume by a known amount;

(d) a nonvolatile RAM for storing equivalent inner volumes of the work side pneumatic system calculated for respective types of works;

(e) check means for calculating an equivalent change $\Delta V_E$ from the corresponding equivalent inner volume read out of the nonvolatile RAM and the pressure difference resulting from the volumetric change by the volume changing means and measured by the differential pressure sensing means, and for comparing the calculated value with the volumetric change to thereby decide whether an error therebetween is smaller than a predetermined value or not;

(f) leakage calculating means for calculating the leakage from the work on the basis of the corresponding equivalent inner volume read out of the nonvolatile RAM and the pressure difference measured by the differential pressure sensing means;

(g) means for deciding whether the leakage calculated by the leakage calculating means is smaller than an allowable leakage or not; and (h) indicating means for indicating a decision made by the deciding means.

15. Leak test equipment according to claim 13 or 14, further including calibrating means whereby during calibration an equivalent inner volume $V_E$ is calculated from the volumetric change produced by the volume changing means and the pressure difference caused by the volumetric chanbe and detected by the differential pressure sensing means, and the corresponding equivalent inner volume stored in the nonvolatile RAM is rewritten with the newly calculated equivalent inner volume.

16. Leak test equipment according to claim 15, wherein the equivalent inner volume calculating means, the check means, the calibration means, the leakage calculating means, and the deciding means are constituted by a single microcomputer including a CPU, a ROM, and a RAM.

17. A leak test method comprising:
(a) a pressurizing process of charging air of a fixed pressure into a work side pneumatic system having a work connected thereto and a master side pneumatic system having a master tank connected thereto;
(b) a balancing process of closing the work side pneumatic system and the master side pneumatic system and maintaining them in this closed state for a predetermined time; and
(c) a detecting process including, in a leak test mode, (1) a step of measuring a pressure difference $\Delta P$ between the work side pneumatic system and the master side pneumatic system by differential pressure sensing means, (2) a step of reading a corresponding equivalent inner volume $V_E$ prestored in a nonvolatile RAM, (3) a step of calculating a leakage $\Delta V_L = V_E \cdot \Delta P / 1.03$ on the basis of the pressure difference $\Delta P$ and the equivalent inner volume $V_E$, and (4) a step of deciding whether the calculated leakage $\Delta V_L$ is smaller than an allowable leakage $L_1$.

18. A leak test method according to claim 17, wherein, the detecting process includes, in a check mode:
(1) a step of causing a predetermined volumetric change $\Delta V$ in the work side pneumatic system by volume changing means;
(2) a step of measuring the pressure difference $\Delta P$ caused between the work side pneumatic system and the master pneumatic system by the volumetric change;
(3) a step of calculating an equivalent inner volume $V_E$ from the volumetric change $\Delta V$ and the pressure difference $\Delta P$;
(4) a step of calculating an error E between the calculated equivalent inner volume $V_E$ and the corresponding equivalent inner volume stored in the nonvolatile RAM; and
(5) a step of deciding whether the error E thus calculated is within the range of an allowable error.

19. A leak test method according to claim 17, wherein the detecting process includes, in a check mode:
(1) a step of causing a predetermined volumetric change $\Delta V$ in the work side pneumatic system by volume changing means;
(2) a step of measuring the pressure difference $\Delta P$ caused between the work side pneumatic system and the master side pneumatic system by the volumetric change;
(3) a step of calculating an equivalent inner volume $\Delta V_E$ from the corresponding equivalent inner volume $V_E$ read out of the nonvolatile RAM and the pressure difference $\Delta P$ resulting from the volumetric change;
(4) a step of calculating an error E between the calculated equivalent volumetric change $\Delta V_E$ and the volumetric change $\Delta V$; and
(5) a step of deciding whether the error thus calculated is within an allowable range.

20. A leak test method according to claim 18 or 19, wherein when it is decided, in the check mode, that the calculted error is outside the allowable range, a calibration mode is initiated, in which the sequence of pressurizing process, balancing process and detecting process is executed again, and the detecting process includes:
(1) a step of causing a predetermined volumetric change $\Delta V$ in the work side pneumatic system by the volume changing means;
(2) a step of measuring the pressure difference caused between the work side pneumatic system and the master side pneumatic system by the volumetric change;
(3) a step of calculating an equivalent inner volume $V_E$ from the volumetric change $\Delta V$ and the pressure difference $\Delta P$; and
(4) a step of rewriting an old equivalent inner volume stored in the nonvolatile RAM with the calculated equivalent inner volume $V_E$.

* * * * *